United States Patent
Begon et al.

(10) Patent No.: US 7,552,285 B2
(45) Date of Patent: Jun. 23, 2009

(54) LINE FILL TECHNIQUES

(75) Inventors: Florent Begon, Antibes (FR); Nicolas Chaussade, Mouans-Sartoux (FR); Elodie Charra, Antibe (FR); Philippe Luc, Nice (FR)

(73) Assignee: ARM Limited, Cambridge (GB)

( * ) Notice: Subject to any disclaimer, the term of this patent is extended or adjusted under 35 U.S.C. 154(b) by 323 days.

(21) Appl. No.: 11/512,396

(22) Filed: Aug. 30, 2006

(65) Prior Publication Data
US 2008/0059705 A1    Mar. 6, 2008

(51) Int. Cl.
*G06F 13/00* (2006.01)
*G06F 13/28* (2006.01)

(52) U.S. Cl. .................................. 711/133; 711/118
(58) Field of Classification Search ............... None
See application file for complete search history.

(56) References Cited

U.S. PATENT DOCUMENTS 5,133,061 A * 7/1992 Melton et al. ............... 711/128
6,792,452 B1 * 9/2004 Philyaw ...................... 709/217

* cited by examiner

*Primary Examiner*—Kevin Verbrugge
*Assistant Examiner*—Eric S Cardwell
(74) *Attorney, Agent, or Firm*—Nixon & Vanderhye P.C.

(57) ABSTRACT

A line fill method, line fill unit and data processing apparatus are disclosed. The line fill method, comprises the steps of: a) associating a line fill buffer with a unique identifier; b) initiating a line fill request to provide said line fill buffer with line fill data, said line fill request having said unique identifier associated therewith; and c) in the event that said line fill buffer is filled with said line fill data prior to said line fill data having been returned in response to said line fill request, associating said line fill buffer with a different unique identifier to enable a subsequent line fill request to be initiated. By enabling the line fill buffer to be associated with different unique identifiers, the line fill buffer can initiate a new request despite the previous request not having been completed without there being any concern that the returned data may be misallocated. This enables multiple line fill requests to be simultaneously pending and subsequent line fill requests to be initiated whilst previous line fill requests are outstanding. Accordingly, subsequent line fill requests may be initiated earlier than would have been possible had the line fill buffer had to wait for all of the line fill data associated with each line fill request to be returned.

18 Claims, 3 Drawing Sheets

LINE FILL TECHNIQUES

FIELD OF THE INVENTION

The present invention relates to line fill techniques. Embodiments of the present invention relate to a line fill method, a line fill unit and a data processing apparatus.

BACKGROUND OF THE INVENTION

Line fill techniques are known. Typically, in a data processing apparatus, a cache is provided to store data for subsequent use by a processor core. When data is first requested by the processor core it is read from main memory and provided to the processor core and stored in the cache.

In many data processing apparatuses, it is assumed that if a processor core requires a particular data value then it is likely that the processor core will need other data values located in addresses adjacent to that data value. Accordingly, it is typical for not only the requested data value to be returned from the main memory but also for other data values to provide a complete cache line to be returned from main memory and stored in the cache. Hence, a line fill buffer may typically be provided into which the complete cache line may be stored prior to being allocated to the cache.

Accordingly, should the processor core indeed require another data value from within that cache line then this data value will already be allocated within the cache and can be accessed by the core without having to perform a time consuming data access to the main memory.

In many data processing apparatus a single line fill buffer is sufficient to store data for line fill requests. However, since each line fill request may take a relatively large number of cycles to complete then there is a finite time before which another line fill request can be initiated. Hence, it is also known to provide additional line fill buffers in order to enable multiple line fill requests to occur simultaneously.

It is desired to provide an improved line fill technique.

SUMMARY OF THE INVENTION

According to a first aspect of the present invention there is provided a line fill method, comprising the steps of: a) associating a line fill buffer with a unique identifier; b) initiating a line fill request to provide the line fill buffer with line fill data, the line fill request having the unique identifier associated therewith; and c) in the event that the line fill buffer is filled with the line fill data prior to the line fill data having been returned in response to the line fill request, associating the line fill buffer with a different unique identifier to enable a subsequent line fill request to be initiated.

The present invention recognizes that in some circumstances a line fill request will be initiated and, during the relatively long period of time taken for the line fill date to be returned in response to that line fill request, the line fill buffer can be provided with all of the line fill data required. Hence, the line fill buffer will have all the data which is needed to perform the line fill but there will be a pending line fill request which has yet to complete.

Accordingly, the line fill buffer is associated with a unique identifier and each line fill request has the unique identifier associated therewith. In the event that the line fill buffer is filled with the line fill data before the response to the line fill request has occurred, the line fill buffer may be given a new unique identifier to enable a further line fill request to be issued, if required. By enabling the line fill buffer to be associated with different unique identifiers, the line fill buffer can initiate a new request despite the previous request not having been completed without there being any concern that the returned data may be misallocated.

It will be appreciated that this enables multiple line fill requests to be simultaneously pending and subsequent line fill requests to be initiated whilst previous line fill requests are outstanding. In this way, subsequent line fill requests may be initiated earlier than would have been possible had the line fill buffer had to wait for all of the line fill data associated with each line fill request to be returned. This can significantly improve the performance of the data processing apparatus, particularly when large areas of memory are being initialized which causes many line fill operations to take place in rapid succession.

In one embodiment, the method comprises the step of allocating the line fill data from the line fill buffer to a memory.

Accordingly, once the line fill buffer has been filled this line fill data may then be allocated to the memory.

In one embodiment, the method comprises the step of indicating that the line fill buffer is available to perform the subsequent line fill request once the line fill data has been allocated to the memory.

Accordingly, once the previous line fill data has been safely allocated to the memory the line fill buffer may be reused for a subsequent line fill operation.

In one embodiment, the memory is a cache.

In one embodiment, the method comprises the step of filling the line fill buffer with the line fill data provided other than in response to the line fill request.

Accordingly, the line fill buffer may be filled with data from a source other than that which is responding to the line fill request.

In one embodiment, the method comprises the step of filling the line fill buffer with the line fill data provided by a processor core.

It will be appreciated that in some circumstances the data for the complete cache line may be provided by the core itself which can occur significantly faster than data provided by, for example, an external memory.

In one embodiment, the method comprises the step of filling the line fill buffer with the line fill data generated by a core in response to data processing instructions.

Accordingly, the core may generate the data to be stored in the cache line in response to a sequence of instructions being executed thereon, such as would occur during, for example, a memory initialization where predetermined values are stored in a region of memory.

In one embodiment, the method comprises the step of filling the line fill buffer with the line fill data provided by a store buffer.

In one embodiment, the line fill data which filled the line fill buffer prior to the line fill data having been returned in response to the line fill request is line fill data which would otherwise have overwritten the line fill data returned in response to the line fill request.

Hence, it is recognized that it is often the case that the data generated locally would anyway overwrite the data values returned from, for example an external memory in response to the line fill request and so there is no coherency problem by allocating the line fill data prior to the line fill request having been completed.

In one embodiment, the method comprises the step of providing a list of unique identifiers which may be selected.

Hence, a number of unique identifiers may be provided which may be selected. It will be appreciated that the precise number of identifiers can be determined based upon the expected activities of the line fill buffer.

In one embodiment, the method comprises the step of maintaining an indication of those unique identifiers in the list which have been allocated to the line fill buffer, but which the line fill data has yet to be returned in response to the associated line fill request.

By maintaining an indication of those unique identifiers which have been allocated but which yet have yet to complete ensures that two line fill requests can not be initiated using the same unique identifier, thereby causing requests to become confused.

In one embodiment, the method comprises the step of removing the indication when the line fill data has been returned in response to the associated line fill request.

Hence, once the request has been completed the unique identifier can be returned to the pool of identifiers which may be used by the line fill buffer.

In one embodiment, the step of associating comprises the step of selecting a unique identifier from the list of unique identifiers which may be selected.

Hence, only those identifiers on the list may be selected.

In one embodiment, the method comprises the step of in the event that the line fill buffer is filled with the line fill data prior to the line fill data having been returned in response to the line fill request, discarding the line fill data returned in response to the line fill request.

Accordingly, once the data is eventually returned in response to the line fill request this data may be safely discarded since the line fill data has already been allocated to the memory. As mentioned previously, it is likely that the data returned following the allocation to the memory could not be used anyway since this data may not represent the current value for those addresses.

In one embodiment, a plurality of line fill buffers are provided, each operable to initiate a line fill request having a unique identifier associated therewith.

Accordingly, where multiple line fill buffers are provided these may each maintain their own list of unique identifiers which may be selected from or may each be able to access a common list of unique identifiers from which to select.

In one embodiment, the step c) comprises: in the event that the line fill buffer is filled with the line fill data prior to all of the line fill data having been returned in response to the line fill request and a subsequent line fill request is required to be initiated, associating the line fill buffer with a different unique identifier to enable the subsequent line fill request to be initiated.

According to a second aspect of the present invention there is provided a line fill unit, comprising: a line fill buffer having a unique identifier associated therewith; request logic operable to initiate a line fill request to provide the line fill buffer with line fill data, the line fill request having the unique identifier associated therewith; and reuse logic operable in the event that the line fill buffer is filled with the line fill data prior to the line fill data having been returned in response to the line fill request, to associate the line fill buffer with a different unique identifier to enable a subsequent line fill request to be initiated.

According to a third aspect of the present invention, there is provided a data processing apparatus, comprising: buffer means having a unique identifier associated therewith; request means for initiating a request to provide the buffer means with data, the request having the unique identifier associated therewith; and reuse means for associating, in the event that the buffer means is filled with the data prior to the data having been returned in response to the request, the buffer means with a different unique identifier to enable a subsequent request to be initiated.

BRIEF DESCRIPTION OF THE DRAWINGS

The present invention will be described further, by way of example only, with reference to embodiments thereof as illustrated in the accompanying drawings, in which.

DESCRIPTION OF THE EMBODIMENTS

Figure 1:
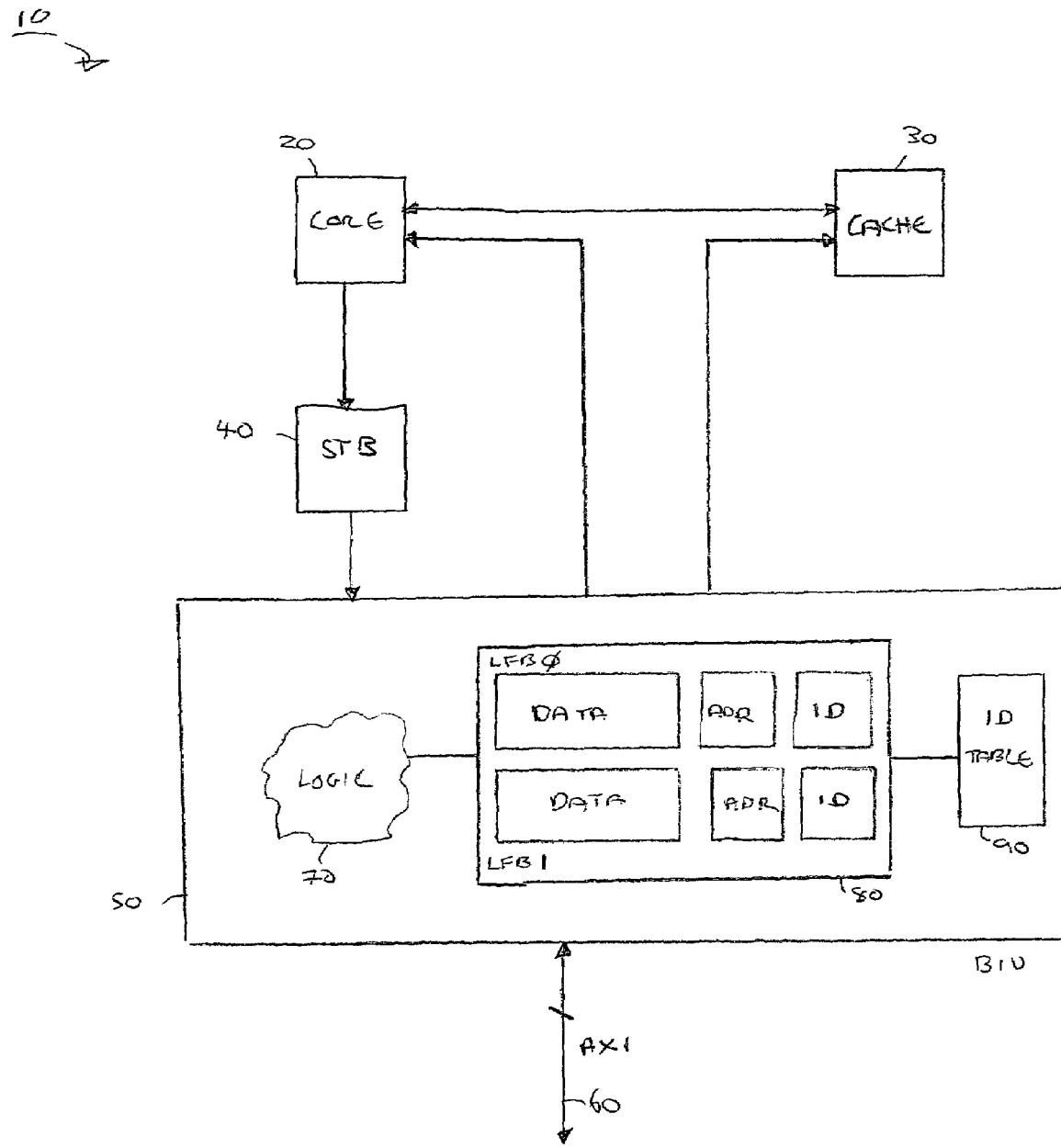
FIG. 1 illustrates a data processing apparatus incorporating a line fill unit according to one embodiment.

FIG. 1 illustrates schematically a data processing apparatus, generally 10 according to an embodiment. The data processing apparatus 10 comprises a processor core 20 coupled with a cache memory 30. Also coupled with the core 20 is a store buffer 40 for receiving data values to be written to a main memory (not shown). A bus interface unit 50 is also provided which couples the core 20, the cache 30 and the store buffer 40 with an AXI bus 60 to enable data transactions to be performed with other components of the data processing apparatus 10, such as the main memory.

The bus interface unit 50 comprises logic 70, line fill buffers 80 and an ID table 90. As will be explained in more detail below, the logic 70, line fill buffers 80 and the ID table 90 are utilized when the core 20 performs a data access to the cache 30 and a cache miss occurs in the cache 30 which results in the need for a line fill operation to be performed in order to allocate a cache line in the cache 30 which includes the data value requested to be accessed by the core 20. Although two entries are illustrated as being provided within the line fill buffer 80, it will be appreciated that any number of entries could be provided, as appropriate to the design and operation of the data processing apparatus 10. The two entries are each operable to store a unique ID obtained with reference to the ID table 90, an address of the cache line to be provided and a data portion for storing the data values of that cache line.

As also will be explained in more detail below, when a line fill request occurs, a currently unused entry in the line fill buffer 80 is selected and allocated a unique ID with reference to the ID table 90, its address is loaded into the address portion and a line fill request is initiated over the AXI bus 60, that request being associated with the unique ID. The unit holding the data values subject of the line fill request will in due course respond to the line fill request by providing the requested data values over the AXI bus 60, these data values being associated with the unique ID. These data values will then be stored in the data portion of the selected entry in the line fill buffer 80.

However, in the event that the data values associated with that address become available to the line fill buffer 80, such as may occur if the data values are generated by the processor core and provided to the store buffer 40, then these data values may be merged into the selected entry of the line fill buffer 80 before all of the data values have been provided over the AXI bus 60.

For example, the following example code will write a cache line if the first read is not zero (R10 is the address aligned on a cache line):

```
loop:
LDR r0, [r10]
CMP r0,#0
STMNEIA r10!, {r2, r3, r4, r5, r6, r7, r8, r9}
B loop
```

As it will be appreciated, this code only needs the critical word in the line fill and will write immediately other data on the line. Accordingly, once the entry in the line fill buffer 80 is full then the line fill operation to the cache 30 can occur even though all the data has yet to be provided over the AXI bus 60. In this way, it will be appreciated that the line fill operation can complete more quickly than would otherwise be the case. Also, since the line fill operation has completed, the entry in the line fill buffer 80 may then be reused for a subsequent line fill operation simply by assigning a new unique ID from the ID table 90 to that entry. Assigning a new unique identifier ensures that a subsequent line fill request initiated by the line fill buffer 80 will not be confused with a previous request and data values from different requests do not become mixed together.

Figure 2:
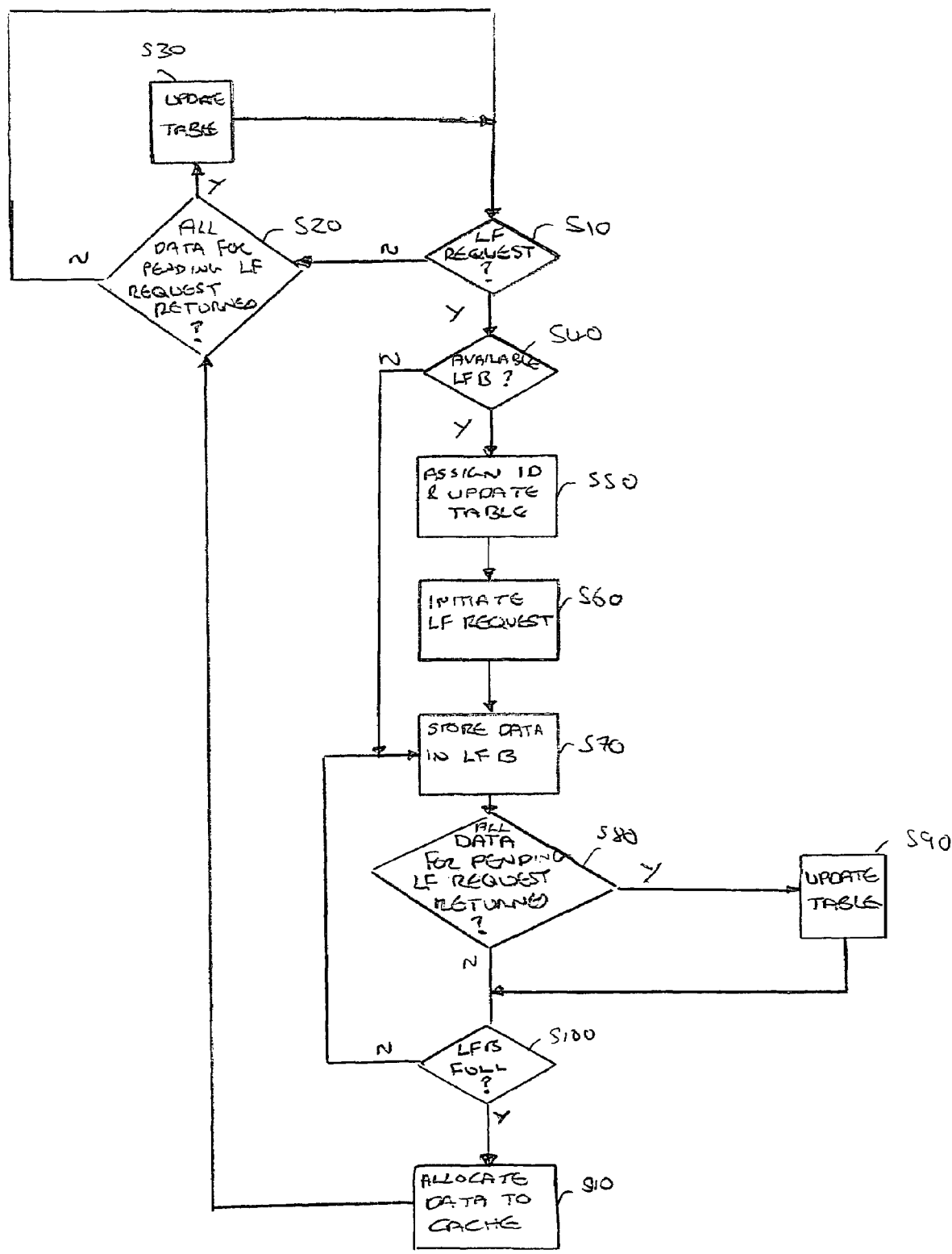
FIG. 2 is a flow chart illustrating the operation of the data processing apparatus illustrated in FIG. 1.

FIG. 2 illustrates the operation of the bus interface unit 50 in more detail. At step S10, it is determined whether or not a line fill request has been received. In the event that no line fill request is received then processing proceeds to step S20 where it is determined whether all of the data for a previous line fill request has been returned over the AXI bus 60. If all of the data for that previous request has not been received then processing returns to step S10. If the data for a previous request has now been returned then, at step S30, the unique identifier table 90 is updated.

If, at step S10, it is determined that there is a line fill request, then processing proceeds to step S40 where it is determined whether or not there is a line fill buffer entry available. If it is determined at step S40 that no line fill buffer entry is available, since they are both dealing with previous line fill requests that have yet to be complete, then processing proceeds to step 70. In the event that it is determined that there is an available line fill buffer entry at step S40 then processing proceeds to step S50.

At step S50 the selected line fill buffer entry is allocated a unique ID from the available ID's indicated in the ID table 90.

Thereafter, at step S60, that line fill buffer 80 will initiate a line fill request which requests the cache line of data values associated with the address, the line fill request being associated with the unique identifier.

Thereafter, at step S70, any data values corresponding to the address stored in the address portion of the entry and having the ID stored in the ID portion of the entry received over the AXI bus 60 or from the store buffer 40 are stored in the relevant part of the data portion of that entry.

At step S80, it is determined whether all the data values for any pending line fill requests have been returned over the AXI bus 60. If it is determined that all the data values associated with the line fill request have been returned over the AXI bus 60 then at step S90, the unique identifier table 90 is updated. In the event that not all of the data associated with those line fill requests have been returned over the AXI bus 60 then the unique identifier table 90 remains unchanged.

Thereafter, at step S100, a determination is made as to whether the data portion of the line fill buffer entry has now been filled. In the event that the data portion is not filled then processing returns to step S70. In the event that the line fill buffer entry is now full then processing proceeds to step S110.

At step S110, the data values stored in the full line fill buffer entry are then allocated to the cache 30 and processing returns to step S20.

In this way, it can be seen that as line fill requests are received an available line fill buffer entry is selected. That entry is then assigned an available unique identifier with which to associate a line fill request. Once the line fill buffer entry becomes full of the requested data values then that cache line of data values can be allocated to the cache 30. Also, the data values returned over the AXI bus 60 are constantly monitored in order to determine when all of the data values associated with a line fill request have been provided over that bus 60. When all of the data values have been provided over the AXI bus 60 the unique identifier table is updated to free that unique identifier for a subsequent line fill request.

Figure 3:
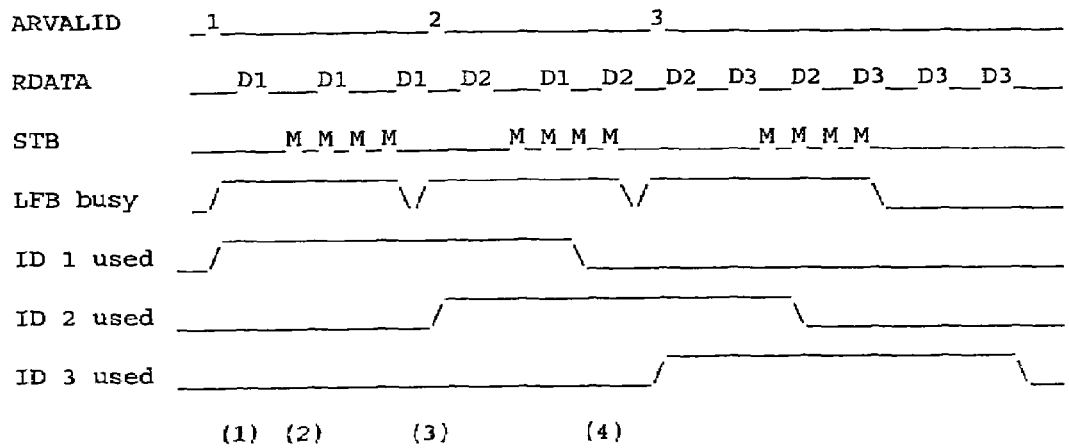
FIG. 3 is a timing diagram illustrating the operation of the line fill buffer in more detail.

FIG. 3 is a timing diagram illustrating the operation of the bus interface unit 50 in more detail in response to the code mentioned above.

At time (1), a line fill request is received; the line fill buffer entry zero LFB0 is selected since it is currently available and the line fill buffer entry zero LFB0 is allocated a unique identifier (ID1) by the ID table 90.

The line fill request is transmitted over the AXI bus 60 with an identifier ID1. The data associated with the line fill request is then returned over the AXI bus as data packets D1, having the identifier ID1.

At time (2), the requested word is returned and the store buffer 80 performs four merges into the line fill buffer entry zero LFB0.

At time (3), all of the data in the line fill buffer zero LFB0 is valid and so it is then allocated to the cache 30 and the line fill buffer zero LFB0 is marked as available. A new request can then be dealt with.

A line fill request is then sent on the AXI 60 with the unique identifier 2. The remaining data provided over the AXI bus 60 having an ID1 can then simply be discarded.

At time (4), the last data having ID1 is received and the ID table 90 is updated to make the identifier one available for future accesses.

Figure 4:
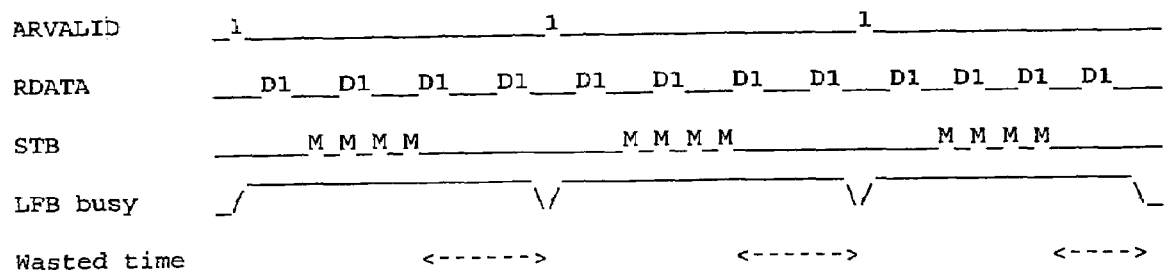
FIG. 4 is a timing diagram illustrating the operation of the line fill buffer without dynamic unique identifier allocation.

As shown in FIG. 4, had the line fill buffer not had dynamic unique identifier allocation then although all the data for the line fill buffer was available, the line fill buffer could not be used for the time period illustrated because the line fill buffer entry would not be freed until the last item of data has been returned over the AXI bus 60.

However, the embodiment illustrated in FIG. 1 makes the line fill buffer entries available for future line fill requests despite all of the requested data not yet being returned over the AXI bus 60. It will be appreciated that this significantly improves performance of the data processing apparatus 10. This improvement is particularly apparent when the data unit providing the line fill data is very slow.

Although a particular embodiment of the invention has been described herein, it will be appreciated that the invention is not limited thereto, and that many modifications and additions may be made within the scope of the invention. For example, various combinations and features of the following dependent claims could be made with features of the independent claims without departing from the scope of the invention.

We claim:

1. A line fill method, comprising the steps of:
   a) associating a line fill buffer with a unique identifier;
   b) initiating a line fill request to provide said line fill buffer with line fill data, said line fill request having said unique identifier associated therewith; and c) in the event that said line fill buffer is filled with said line fill data prior to said line fill data having been returned in response to said line fill request, associating said line fill buffer with a different unique identifier to enable a subsequent line fill request to be initiated.

2. The method of claim 1, comprising the step of:
allocating said line fill data from said line fill buffer to a memory.

3. The method of claim 2, comprising the step of:
indicating that said line fill buffer is available to perform said subsequent line fill request once said line fill data has been allocated to said memory.

4. The method of claim 2, wherein said memory is a cache.

5. The method of claim 1, comprising the step of:
filling said line fill buffer with said line fill data provided other than in response to said line fill request.

6. The method of claim 1, comprising the step of:
filling said line fill buffer with said line fill data provided by a processor core.

7. The method of claim 1, comprising the step of:
filling said line fill buffer with said line fill data generated by a core in response to data processing instructions.

8. The method of claim 1, comprising the step of:
filling said line fill buffer with said line fill data provided by a store buffer.

9. The method of claim 1, wherein said line fill data which filled said line fill buffer prior to said line fill data having been returned in response to said line fill request is line fill data which would otherwise have overwritten said line fill data returned in response to said line fill request.

10. The method of claim 1, comprising the step of:
providing a list of unique identifiers which may be selected.

11. The method of claim 10, comprising the step of:
maintaining an indication of those unique identifiers in said list which have been allocated to said line fill buffer, but which said line fill data has yet to be returned in response to said associated line fill request.

12. The method of claim 11, comprising the step of:
removing said indication when said line fill data has been returned in response to said associated line fill request.

13. The method of claim 10, wherein said associating comprises the step of:
selecting a unique identifier from said list of unique identifiers which may be selected.

14. The method of claim 1, comprising the step of:
in the event that said line fill buffer is filled with said line fill data prior to said line fill data having been returned in response to said line fill request, discarding said line fill data returned in response to said line fill request.

15. The method of claim 1, wherein a plurality of line fill buffers are provided, each operable to initiate a line fill request having a unique identifier associated therewith.

16. The method of claim 1, wherein said step c) comprises:
in the event that said line fill buffer is filled with said line fill data prior to all of said line fill data having been returned in response to said line fill request and a subsequent line fill request is required to be initiated, associating said line fill buffer with a different unique identifier to enable said subsequent line fill request to be initiated.

17. A line fill unit, comprising:
a line fill buffer having a unique identifier associated therewith;
request logic configured to initiate a line fill request to provide said line fill buffer with line fill data, said line fill request having said unique identifier associated therewith; and
reuse logic, in the event that said line fill buffer is filled with said line fill data prior to said line fill data having been returned in response to said line fill request, configured to associate said line fill buffer with a different unique identifier to enable a subsequent line fill request to be initiated.

18. A data processing apparatus, comprising:
a buffer having a unique identifier associated therewith;
request means for initiating a request to provide said buffer with data, said request having said unique identifier associated therewith; and
reuse means for associating, in the event that said buffer is filled with said data prior to said data having been returned in response to said request, said buffer with a different unique identifier to enable a subsequent request to be initiated.

* * * * *